Dec. 13, 1966         W. E. GLENN, JR         3,291,903
COLORED LIGHT PROJECTION SYSTEM
Filed Nov. 1, 1963                            2 Sheets-Sheet 1

Inventor:
William E. Glenn Jr.,
by Richard R. Brainard
His Attorney.

Inventor:
William E. Glenn Jr.,
by Richard R. Brainard
His Attorney.

United States Patent Office 3,291,903
Patented Dec. 13, 1966

3,291,903
COLORED LIGHT PROJECTION SYSTEM
William E. Glenn, Jr., Scotia, N.Y., assignor to General
Electric Company, a corporation of New York
Filed Nov. 1, 1963, Ser. No. 320,912
8 Claims. (Cl. 178—5.4)

The present invention relates to an improved colored light projection system and particularly to such a system for use with a light-controlling medium for controlling the transmission or reflection of light in accordance with the color picture or other color information impressed on the medium in the form of physical deformations. This application is a continuation-in-part of my application Serial No. 49,746, now abandoned, filed August 15, 1960.

In my Reissue Patent No. 25,169, dated May 15, 1962, is described and claimed a system in which color information impressed on a light controlling medium in the form of a plurality of superimposed diffraction patterns corresponding respectively to a plurality of color components is projected by means of a light masking system which selects color by passing substantially only the first order diffraction from each diffraction pattern corresponding to a color component.

In an improved color projection system, such as the one described and claimed in my Patent No. 3,078,338, dated February 19, 1963, the superimposed diffraction patterns are orthogonally arranged, i.e. the diffraction pattern corresponding to one color component extends orthogonally with respect to the diffraction pattern or patterns corresponding to the remaining color information to be projected. In the masking system there shown separate masking areas, specifically in the form of bars and slots, are provided to block the zero order or undifracted light and pass the first order diffracted light corresponding to the color information of the respective orthogonally arranged diffraction gratings. The orthogonal arrangement minimizes certain inner action or beats between the color information contained in the orthogonally arranged gratings. The light transmitted through the separate masking systems is combined optically to project the complete color image.

The invention described and claimed in the aforementioned application Serial No. 49,746 of which the present application is a continuation-in-part, relates to a still further improvement in colored light projection systems, particularly useful in connection with light controlling mediums in which the color information to be projected is contained in orthogonally arranged light diffraction gratings. In accordance with a specific embodiment of the invention claimed in the parent application, the projected color information is controlled by a light source focusing system and a light controlling medium including orthogonally arranged diffraction patterns in combination with a color filter masking system including spaced parallel strips corresponding to a single color component and extending in the direction of diffraction produced by the diffraction grating corresponding to that single color component and a second set of spaced parallel filter strips corresponding in color to the remaining light to be projected. In a specific embodiment the single color is green and the remaining colored light is magenta. The filter mask described includes areas where the filter strips cross which are opaque, areas which constitute a green filter, areas which constitute a magenta filter and clear areas. When used in conjunction with the light controlling medium, light impinging on the medium is focused on the opaque areas of the filter mask when the light controlling medium is undeformed, i.e. produces no diffraction. Deformations corresponding to green light diffract the light through the green areas of the filter while deformations corresponding to red, blue, or magenta light diffract the light through the magenta filter areas. Combinations of the green and either red or blue may pass through the clear areas. Such a system minimizes undesirable interaction between the light projected under the control of the orthogonally arranged diffraction patterns and the brightness is greater for light such as yellow, cyan, or white resulting from combinations of the green and magenta components.

The invention claimed in the present application is applicable to a system of the type described in the parent application and to other systems employing superimposed diffraction gratings on a light modulating medium and a cooperating light masking system. In accordance with an important aspect of the present invention, the gratings and light masks cooperate to block the unwanted portions of the spectrum on the same opaque area for either of two color components. The color components themselves are passed by areas on the opposite sides from the opaque area which blocks this unwanted first order light. Stated in another way, one color component, for example blue, passes through an opening or light transmitting area adjacent the opaque area which intercepts the zero order light while a second component, for example red, passes through the second light transmitting area out from the opaque area on which the zero order is intercepted. This means that the grating spacing for the color components has an inverse relationship with respect to the wavelengths of those components as compared to a system where the wanted portion of the first order spectrum passes through the same opening or light transmitting area of the mask. In accordance with the present invention, for example, if the superimposed gratings are for blue and red, respectively, the wavelength of the grating for blue is chosen so that the red portion of the spectrum is blocked by the same opaque area as blocks the blue portion of the spectrum when a red grating is present. This means that the grating spacing for the red component is smaller than for blue as contrasted with a system where the first order of wanted color components all pass through the same light transmitting area. In the latter system the grating spacing is greater for the longer wavelength of light, i.e. the red grating is longer than the blue grating.

In an illustrated embodiment of the present invention, a system is provided in which red and blue components of light are impressed on the light valve medium as superimposed gratings extending in the same direction. The first order longer wavelength light, i.e. red, passes through the light transmitting area further removed from the opaque area intercepting the zero order light and is controlled by the grating on the medium having a smaller grating than is employed for the shorter wavelength light, i.e. blue. The unwanted first order light for both color components is blocked by the same opaque area. This means that the unwanted light of higher orders is similarly blocked by opaque areas of the mask further removed from the opaque area intercepting the zero order and unwanted light from higher orders is therefore not transmitted. The system has another advantage in that the closest spaced diffraction grating is employed for the longest wavelength light which is the hardest to select by diffraction. This means that there is the greatest dispersion of this component which permits better selection for a given electron beam spot size which limits the finest gratings that can be written satisfactorily. The system will therefore provide better color purity for a given resolution and amount of light transmitted or it will give better resolution and more light for a given color purity. It is accordingly an important object of the present invention which provides a diffraction type light valve projection system employing superimposed gratings which provides better performance with respect to one or more of the performance criteria of color purity, brightness of projected picture, or resolution.

Further objects and advantages of my invention will become apparent as the following description proceeds, reference being had to the accompanying drawings and its scope will be pointed out in the appended claims. In the drawing:

Before describing the color projection system embodying my present invention, a suitable system and method for writing color information on a light modulating medium will be briefly described by reference to FIG. 1 of the accompanying drawing which illustrates schematically a system for impressing color information corresponding to color television pictures on a tape having a thermoplastic recording layer. Apparatus method and medium for thermoplastic recording of information, particularly information contained in electrical signals, is described and broadly claimed in my copending application Serial No. 8,842, filed February 15, 1960, now Patent No. 3,113,178 which application is a continuation-in-part of my application Serial No. 698,167, filed November 22, 1957, now abandoned, and also a continuation-in-part of my application Serial No. 783,584, filed December 29, 1958, now abandoned, the latter application also being a continuation-in-part of application Serial No. 698,167.

Systems embodying the diffraction of different component colors in orthogonal directions are disclosed and claimed in my aforementioned Patent No. 3,078,338. The electron beam system of FIG. 1 may be similar to that described in connection with FIG. 4 of my copending application Serial No. 835,208, filed August 21, 1959, now Patent No. 3,18,969.

Figure 1:
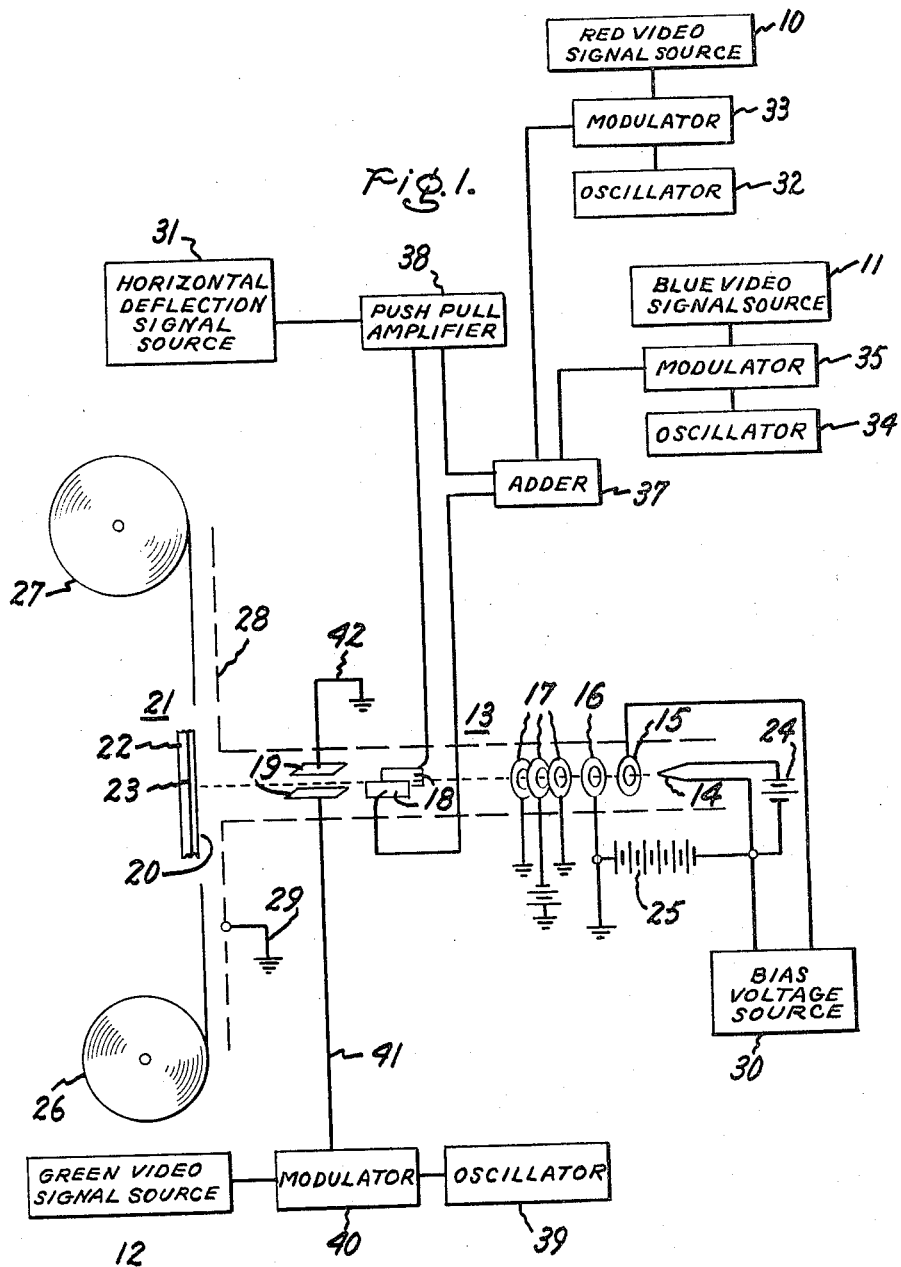
FIG. 1 is a schematic representation of an electron beam apparatus for impressing diffraction patterns on a light controlling medium of a type suitable for use in the color projection systems of my present invention.

Referring now to FIG. 1, there is illustrated an apparatus for recording color information corresponding to the color television signals representing the red, blue and green video signal sources 10, 11 and 12, respectively. The recording is accomplished by an electron beam apparatus 13 including a filamentary cathode 14, an annular grid 15, an annular anode 16, three annular lens members 17, horizontal electrostatic deflection plates 18, and vertical electrostatic deflection plates 19. The beam impinges on a thermoplastic surface 20 of a recording tape 21 which may include a heavier transparent backing layer 22 and an intermediate transparent conducting layer 23.

The cathode 14 is energized by a source of heater voltage 24 and emits electrons under the control of grid 15 which are accelerated by anode electrode 16 which is maintained at a high positive voltage with respect to the cathode by a direct current source illustrated as a battery 25. The electron beam is focused by a known type of lens illustrated as the three annular disks 17 having the intermediate disk maintained in a negative voltage with respect to the two outer disks which are conveniently maintained at ground potential. The focused beam which is preferably of a small cross section, i.e. approximately 0.2 mils, impinges on the thermoplastic layer 20 to establish charge patterns thereon determined by the relative movement of the tape and beam and corresponding in density and distribution to the color information to be recorded.

As illustrated, the tape is supplied from a reel 26 and moved past the area of the beam to take-up reel 27. The reels 26 and 27 and the tape are housed within a vacuum-type enclosure indicated schematically at 28 and maintained at ground potential as shown at 29. In the embodiment illustrated, the electron beam is substantially uniform in intensity which is established by the bias voltage 30 supplied to the grid electrode 15. The beam may also be shut off completely during retrace by a blanking signal voltage source (not shown) applied to the electrode in accordance with usual television practice.

The deflection of the beam in a horizontal direction is accomplished by the horizontal deflection voltage impressed on plates 18 by the deflection signal source 31. In accordance with normal practice, this voltage may have a repetition rate to produce 15,750 raster lines per second. The red and blue color information is impressed on the thermoplastic medium by velocity modulating the horizontal deflection by voltages having a frequency representative of those color components and amplitudes varying in accordance with the intensity of those components. The oscillator for red video information is shown at 32 with its output connected to the modulator 33 by which it is amplitude modulated in accordance with the output of the red video signal source. The frequency of the oscillator 32 may be 15 megacycles, for example. In a similar manner, the oscillator for the blue component which has an operating frequency of 10 megacycles is shown at 34 and supplied to a modulator 35 by which the oscillator output is amplitude modulated in accordance with the blue video signal source 11. The outputs of modulators 33 and 35 are added together in a circuit shown schematically at 37. The output of the adder circuit is superimposed on the horizontal deflection voltage provided by the amplifier 38 and impressed on the horizontal deflection plates 18. It will be readily understood as described in detail in my aforementioned Reissue Patent No. 25,169 that the beam is deflected at a non-uniform rate dependent upon the color information contained in the output of the adder circuit 37. It is slowed down and speeded up relative to the normal deflection velocity, at frequencies corresponding to the outputs of oscillators 32 and 34 and by amounts dependent upon the amplitudes of these signals. The result, since the beam is of constant intensity, is to provide along the horizontal deflection line areas of increased and decreased charged densities which occur at frequencies corresponding to the frequencies of the oscillators 32 and 34 and in magnitudes varying with the magnitudes of the red and blue video signals supplied by sources 10 and 11.

The green color information is established as a charge pattern on the thermoplastic layer 20 by the voltage impressed on the vertical deflection plates 19. This voltage includes the output of oscillator 39 which is modulated in amplitude in accordance with the output of the green video signal source 12 by the modulator 40 and connected to one of the deflection plates by conductor 41, the other deflection plate being grounded as shown at 42. The oscillator 39 is of relatively high frequency compared to the blue and red oscillators 34 and 32, for example, in the order of 50 megacycles. The line of charge corresponding to the raster line is smeared or spread (as the result of what may be considered a vertical wobble of the beam by an amount dependent upon the amplitude of the green video signal). The maximum charge density, i.e. the least vertical deflection, occurs when the green video signal is of smallest amplitude. Since the maximum charge density corresponds to the maximum intensity of green light to be transmitted, the green video signal must be an inverted signal, i.e. a signal having a maximum amplitude when the green color is of minimum intensity. In other words, the green information is impressed on the medium as a line of charge having a charge density varying directly with the intensity of green color component of the information to be recorded.

As illustrated, the tape is handled by reels 26 and 27 which are adapted to move the tape in a vertical direction at a constant speed suitably selected to produce a 525 line raster of desired vertical dimension. As will be readily appreciated, the tape movement and the beam scanning are synchronized by suitable means (not shown).

The thermoplastic layer of the tape is deformed in accordance with the charge pattern by heating it any time after the charge pattern is established and before the charge pattern has been dissipated. It may be accomplished immediately within the housing 28 by high frequency heating of the conducting layer 23 or it may be developed by heating with hot air after the tape is removed from the housing 28. Both of these methods are described in my aforementioned application Serial No. 8,842.

As a result of the writing method described, color information is contained in deformations in the thermoplastic medium 21 in the form of phase diffraction gratings spaced along the raster line and extending in a direction perpendicular to the raster line. These gratings represented the red and blue color information and are in superimposed relationship. Also occupying the same raster line will be a variation in charge density and as a result, a variation in the depth of a single horizontally extending depression corresponding to intensity of the green component information. While the green information, being stored as a single line is in a strict sense reproduced by refraction of the projected light, the variations in depth of this line as well as the variations of the diffraction gratings corresponding to the red and green information will be referred to as diffraction gratings and as extending in orthogonal directions.

Figure 2:
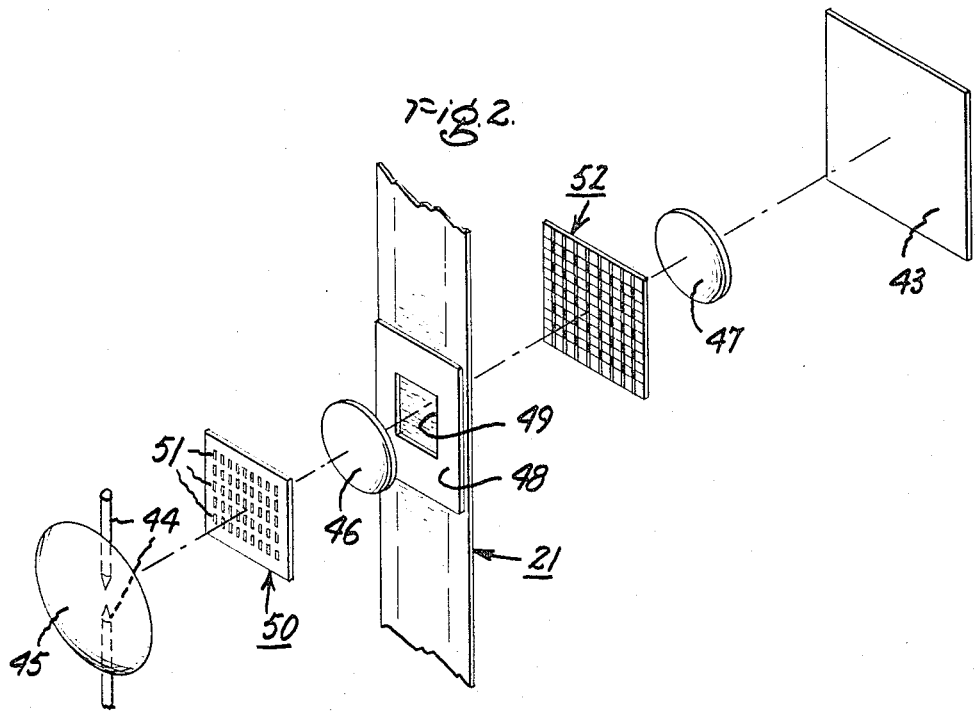
FIG. 2 is a schematic representation of a color projection system embodying my invention.
Figure 3:
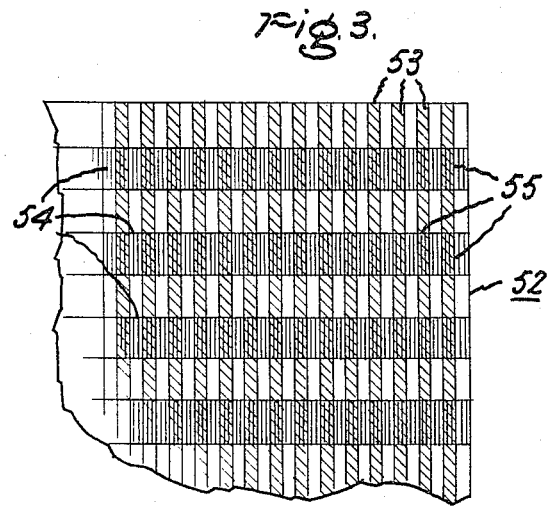
FIG. 3 is an enlarged view of a color filter mask embodying my invention.

In FIGS. 2 and 3 are illustrated a preferred projection system for cooperating with a light modulating medium having deformations of the type just described in connection with the color information writing system of FIG. 1. As illustrated in FIG. 2, the optical system includes a screen 43, for displaying a color image corresponding to the color information stored in a thermoplastic tape 21 and projected by a system including a light source illustrated schematically as a pair of arc electrodes 44 and a reflector 45. A focusing lens 46 is positioned between the tape 21 and the screen 43. A suitable opaque frame 48 having a rectangular aperture 49 corresponding in size to the raster area on the tape is provided. A light masking system for blocking undiffracted light and selectively passing light in accordance with the color information stored on the tape 21 is provided by a mask 50 interposed between the light source 44 and the lens 46 and including rows of rectangular transparent areas or openings 51 and a filter mask 52 interposed between the medium and the projection lens 47 and forming an imporant feature of the present projection system. As better shown in FIG. 3, the filter mask 52 includes a number of vertically extending green filter strips 53 which pass green light only and a number of spaced parallel magenta filter strips 54 extending at right angles to and optically overlying the green filter strips 53. The intersections of these strips 53 and 54 provide a plurality of rectangular opaque areas 55. The mask 52 is positioned in the projection system so that light which passes through the transparent areas 51 of the mask 50 and is focused (undiffracted by tape 21) on the opaque areas 55 of the filter mask 52.

The manner in which the mask 52 cooperates with the deformed light modulating medium provided by the tape 21 and the mask 49 to project light corresponding point-by-point with the color information on the tape 21 will now be described. As previously pointed out, the undiffracted light falls on the opaque areas 55 considering now only the green information the variations in depth of the horizontal extending raster line is effective to diffract (or strictly speaking refract) light along the green filter strips 53 so that it passes through corresponding portions of the green strips included between the opaque areas on which it was originally focused and the opaque areas provided by the intersections of those strips and next magneta strip. The amount of light passing through this filter is dependent upon the depth of this horizontal depression in the recording medium. Since only green light passes through the green filter strips 53, color selection is not required by the width or spacing of the opaque areas. This makes it possible for the openings, i.e. the spacings between the magenta strips to be much wider than they would be if the color selection were accomplished by the spacings of the masking system. Superimposed on the medium are the diffraction patterns corresponding point-by-point with the red and blue information. The frequencies of the red and blue oscillators, the dimensions and spacings of the filter strips, and the optics of the system are chosen so that the diffraction of light along the magenta strips caused by these red and blue diffraction gratings is effective to select the color and to transmit light varying in amount in accordance with the intensity of that color. Since the red and blue are at opposite ends of the spectrum, this masking system requires considerably less selecting ability than one which makes the selection for the entire color spectrum or color content of the picture. This opening up of the masking system improves the resolution and amount of light transmission without adversely affecting the purity of the colors. Assuming the presence on the medium 21 of only a grating corresponding to blue light, light is diffracted along the magenta strips so that the blue light passes through the magenta filter in the region between the opaque area on which the undiffracted light falls and the next adjacent opaque area which latter area intercepts the red light. If the grating on medium 21 corresponds in wave length to red light only, the blue part of the spectrum is blocked by the same opaque area as blocks the red light in the above example. The red light is passed, however, by the second magenta area from the opaque area which blocks the zero order light.

The dimensions of the bars for color selection are derivable in accordance with the well-known relationship $I\lambda/S = I/D$ where N is the order of the diffraction pattern and is one (first order diffraction) in the explanation given above. $\lambda$ is the wavelength of the light under consideration. S is the spacing or wavelength of the diffraction grating on the modulating medium under consideration and D is the distance from the light modulating medium to the filter mask 52. I is the distance from zero order to the location of the Nth order diffracted light having the wave length $\lambda$.

While these considerations are well-known and have been described in detail in the earlier applications referred to, it may be helpful to point out that in a system utilizing an ordinary television raster of 525 lines and approximately 0.8 cm. by 1 cm. and with the frequencies of 10 megacycles for blue and 15 megacycles for red and with a distance D of approximately 4.5 centimeters, the filter mask included green strips of approximately 1 mm. width and 1 mm. spacing while the magneta strips were approximately 2.5 mm. in width and 2.5 mm. spacing. Better color selection will result and almost as much light transmitted if the spacing is 0.6 mm. As previously indicated, the width and spacing of the magenta strips is not at all critical since they are, in effect, passing white light since the total color selection is accomplished by the fact that only one color is to be transmitted through the green strips. As will be readily appreciated the width of the openings 51 in the input mask 50 are such that the zero order light focused on the opaque areas 55 of the output mask 52 are about one-half the width of these areas or about 0.5 mm.

It will be apparent that the modulating frequencies employed for establishing the gratings for the different color components determine for a given system the center frequencies of those colors that are passed in the first order or the center frequencies of the remaining spectrum which is blocked and that the ratio of 3 to 2 in the above example is not highly critical and a ratio of 4 to 3, for example, also works very well. The actual modulating frequencies may be 16 megacycles for red and 12 megacycles for blue, for example. It is apparent from the foregoing description that the present invention provides an improved writing and projection system in which the grating spacings and the light mask are correlated to produce the color selection as between the color represented by two superimposed gratings in such a way that the wanted first order light of the two color components is passed through a different light transmitting area with the longer wavelength color passing through the light transmitting area further displaced from the opaque area intercepting the zero order and thus being subject to the greater dispersion and facilitating the selection of that color which is the more difficult color to select. In the preferred embodiment described and illustrated, blue and red have been discussed as the colors represented by the superimposed gratings extending in the same direction and green as the color extending in an orthogonal direction. It will be apparent, however, that the principles of the invention are equally applicable to superimposed color combinations, for example, the superimposed gratings may represent green and blue, the result being cyan, and the single color component red.

It will also be readily understood that the invention is not limited to filter strip type of light masking systems as shown in the present application, but may equally well be provided by bar and slot systems having two different fields for the orthogonal colors which may be green and magenta, for example. Such a system is illustrated, for example, in FIG. 2 of my aforementioned copending application Serial No. 835,208, filed August 21, 1959.

While I have described and illustrated particular embodiments of my invention, it will be apparent to those skilled in the art that changes and modifications may be made without departing from my invention in its broader aspects, and I intend therefore to cover all such changes and modifications as fall within the true spirit and scope of my invention.

What I claim as new and desire to secure by Letters Patent of the United States is:

1. An information writing and diffraction type light projection system comprising a deformable light modulating medium, means producing two superimposed diffraction gratings of different spacings for diffracting light in the same direction and corresponding respectively to two different color components with the grating of greater grating spacing corresponding to a color component of shorter wavelength and with the ratio of the grating spacings representing the two color components being equal to the inverse ratio of the desired center wavelength of said two color components.

2. An information writing and light projection system comprising a deformable light modulating medium, means producing two superimposed diffraction gratings of different spacings for diffracting light in the same direction and corresponding respectively to red and blue color components with the grating of greater grating spacing corresponding to the blue color component and with the ratio of the grating spacings representing red and blue color respectively being equal to the ratio of the desired center wavelength of blue and red components, respectively.

3. An information writing and diffraction type light projection system comprising a deformable light modulating medium, means producing two superimposed diffraction gratings of different spacings for diffracting light in the same direction and corresponding respectively to two different color components with the grating of greater grating spacing corresponding to a color component of shorter wavelength and with the ratio of the grating spacings representing the two color components being equal to the inverse ratio of the desired center wavelength of said two color components, and a light masking system cooperating with said light modulating medium having opaque areas for blocking undiffracted light and having light transmitting areas displaced at different distances from said opaque areas in the direction of diffraction by said gratings, a light transmitting area nearer an opaque area which blocks zero order light passing first order diffracted light of said color component of shorter wavelength and a light transmitting area further displaced from said opaque area and passing first order diffracted light of said color component of longer wavelength.

4. An information writing and diffraction type light projection system comprising a deformable light modulating medium, means producing two superimposed diffraction gratings of different spacings for diffracting light in the same direction and corresponding respectively to red and blue components with the grating of greater grating spacing corresponding to the blue color component and with the ratio of the grating spacings representing red and blue components respectively being equal to the inverse ratio of the desired center wavelength of blue and red components respectively, and a light masking system cooperating with said light modulating medium having opaque areas for blocking undiffracted light and having light transmitting areas displaced at different distances from said opaque areas in the direction of diffraction by said gratings, a light transmitting area nearer an opaque area which blocks zero order light passing first order blue light and a light transmitting area further displaced from said opaque area and passing first order red light.

5. An electron beam writing and light projection system comprising a deformable light valve medium, means establishing an electron beam and impinging it upon said mediums, means for moving said electron beam relative to said medium to scan an area of said medium including beam deflection means, means for energizing said beam deflection means to modulate the velocity of movement of said beam at two different frequencies in the direction of one dimension of said area and with amplitudes varying respectively with the intensities of two different color components to establish two superimposed diffraction gratings of different grating spacings for diffracting light in the direction of said one dimension, the grating of greater grating spacing having the amplitude thereof determined by the intensity of the color component of shorter wavelength and the grating of lesser grating spacing having the amplitude thereof determined by the intensity of the color component of longer wavelength, a light source and light masking means for transmitting light to an image area under the control of said light modulating medium including an opaque area for intercepting light undiffracted by said medium and two light transmitting areas differently spaced from said opaque area in the direction of diffraction for transmitting first order diffracted light difffracted by different ones of said gratings.

6. An electron beam writing and light valve projection system comprising a deformable light valve medium, means establishing an electron beam and impinging it upon said medium, means for moving said electron beam relative to said medium to scan an area of said medium including beam deflection means, means for energizing said beam deflection means at two different frequencies to modulate the velocity of movement of said beam in the direction of one dimension of said area and with amplitudes varying respectively with the intersities of two different color components to establish two superimposed diffraction gratings of different grating spacings for diffracting light in the direction of said one dimension, the grating of the greater grating spacing having the amplitude thereof determined by the intensity of the color component of shorter wavelength and the grating of lesser grating spacing having an amplitude determined by the intensity of the color component of longer wavelength.

7. An electron beam writing and light valve projection system comprising a deformable light valve medium, means establishing an electron beam and impinging it upon said medium, means for moving said electron beam relative to said medium to scan an area of said medium including beam deflection means, means for energizing said beam deflection means at two different frequencies to modulate the velocity of movement of said beam in the direction of one dimension of said area in accordance with the intensities of red and blue color components to be projected to establish two superimposed diffraction gratings of different grating spacings for diffracting light in the direction of said one dimension, the grating of greater grating spacing having the amplitude thereof determined point-by-point by the intensity of the blue component to be projected and the grating of lesser grating spacing having an amplitude thereof determined point-by-point by the intensity of the red component to be projected.

8. An electron beam writing and light valve projection system comprising a deformable light valve medium, means establishing an electron beam and impinging it upon said medium, means for moving said electron beam relative to said medium to scan an area of said medium including beam deflection means, means for energizing said beam deflection means at two different frequencies to modulate the velocity of movement of said beam in the direction of one dimension of said area in accordance with the intensities of red and blue color components to be projected to establish two superimposed diffraction gratings of different grating spacings for diffracting light in the direction of said one dimension, the grating of greater grating spacing having the amplitude thereof determined point-by-point by the intensity of the blue component to be projected and the grating of lesser grating spacing having an amplitude thereof determined point-by-point by the intensity of the red component to be projected, a light source and light masking means for transmitting light to an image area under the control of said light modulating medium including opaque areas for intercepting light undiffracted by said medium, light transmitting areas differently spaced from said opaque areas in the direction of diffraction for transmitting first order diffracted light diffracted by different ones of said gratings, first order blue light being transmitted through an area closer spaced to the opaque area which intercepts the corresponding zero order light than the area through which the first order red light is transmitted.

No references cited.

DAVID G. REDINBAUGH, *Primary Examiner.*

J. A. O'BRIEN, *Assistant Examiner.*